US 7,581,047 B2

(12) United States Patent
Ilyasov

(10) Patent No.: US 7,581,047 B2
(45) Date of Patent: Aug. 25, 2009

(54) USAGE OF KEYBOARD DRIVER IN EXTENSIBLE FIRMWARE INTERFACE FOR ADDING NEW HOT KEYS AT FIRMWARE LEVEL

(75) Inventor: Oleg Ilyasov, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 391 days.

(21) Appl. No.: 11/042,748

(22) Filed: Jan. 25, 2005

(65) Prior Publication Data

US 2006/0168376 A1 Jul. 27, 2006

(51) Int. Cl.
G06F 13/12 (2006.01)
G06F 13/38 (2006.01)

(52) U.S. Cl. .................. 710/67; 710/1; 710/72; 710/73; 713/1; 713/2; 719/321; 719/327; 341/23

(58) Field of Classification Search .......... 710/67, 710/1, 72, 73; 713/1, 2; 719/321, 327; 341/23
See application file for complete search history.

(56) References Cited

U.S. PATENT DOCUMENTS

| 4,833,594 | A | * | 5/1989 | Familetti et al. | 713/1 |
| 5,173,940 | A | * | 12/1992 | Lantz et al. | 726/19 |
| 5,333,273 | A | * | 7/1994 | Raasch et al. | 710/67 |
| 5,790,120 | A | * | 8/1998 | Lozares et al. | 715/779 |
| 5,886,695 | A | * | 3/1999 | Chew et al. | 715/784 |
| 5,935,225 | A | * | 8/1999 | Peng et al. | 710/67 |
| 6,114,978 | A | * | 9/2000 | Hoag | 341/23 |
| 6,557,170 | B1 | * | 4/2003 | Wilder et al. | 725/130 |
| 2002/0169979 | A1 | * | 11/2002 | Zimmer | 713/200 |
| 2003/0048275 | A1 | * | 3/2003 | Ciolac | 345/544 |
| 2003/0093658 | A1 | * | 5/2003 | Wen et al. | 713/1 |
| 2003/0179247 | A1 | * | 9/2003 | Yu | 345/840 |
| 2003/0208472 | A1 | * | 11/2003 | Pham | 707/2 |
| 2004/0093446 | A1 | * | 5/2004 | Lin | 710/67 |
| 2004/0193868 | A1 | * | 9/2004 | Kuo | 713/2 |

OTHER PUBLICATIONS

Extensible Firmware Interface Specification, Intel Corp., Dec. 2, 2002 Ver. 1.10.*

* cited by examiner

Primary Examiner—Henry W. H. Tsai
Assistant Examiner—Tushar S Shah
(74) Attorney, Agent, or Firm—Hope Baldruff Hartman, LLC

(57) ABSTRACT

A hot key register request is created in an extensible firmware interface application, the hot key register request has a key number and a pointer to a hot key function for the new hot key. The hot key register request is sent to a keyboard driver in the extensible firmware interface. A hot key table is created in working storage from the hot key table in the keyboard driver, and a hot key entry is inserted into the hot key table in working storage. The entry includes the key number and pointer from the hot key register request to add the new hot key as a registered hot key. A success message is sent from the keyboard driver to the extensible firmware interface application. The success message indicates the new hot key has been registered.

17 Claims, 4 Drawing Sheets

USAGE OF KEYBOARD DRIVER IN EXTENSIBLE FIRMWARE INTERFACE FOR ADDING NEW HOT KEYS AT FIRMWARE LEVEL

TECHNICAL FIELD

This invention relates to personal computers and the firmware program code in such computers. More particularly, the invention relates to the usage of a keyboard driver in an extensible firmware interface for adding new keyboard hot keys at the firmware level.

BACKGROUND OF THE INVENTION

For many years personal computers have had hot key functionality. At the BIOS level, this hot key functionality has been provided by the BIOS program code burned into a program chip and read into the computer each time the computer starts up. The term "hot key" refers to a key press or a combination of key presses used to call and execute a predefined function on the computer. For example, the combination of a control "Ctrl", "Alt", and "Del" keys pressed during POST (Power-On-Self-Test). The combination of keystrokes that are defined for a given hot key function become a part of the BIOS program and are burned into the BIOS chip.

A BIOS program designer would thus have to discuss the desired hot keys with a client requesting the BIOS program. The BIOS hot key definitions would then be programmed into the BIOS program and burned into the BIOS chip. In the past there was no capability to reprogram the BIOS hot key definitions after the BIOS chip is burned. If it became desirable to add additional hot keys or change hot keys that have been already defined and burned into the BIOS chip, it was not possible to add or change hot keys.

It is with respect to these considerations and others that the present invention has been made.

SUMMARY OF THE INVENTION

In accordance with present invention, the above and other problems are solved by creating a hot key register request in an extensible firmware interface application, the hot key register request having a key number and a pointer to a hot key function for the new hot key. The hot key register request is sent to a keyboard driver in the extensible firmware interface. A hot key table is created in working storage from the hot key table in the keyboard driver, and a hot key entry is inserted into the hot key table in working storage. The entry includes the key number and pointer from the hot key register request to add the new hot key as a registered hot key. A success message is sent from the keyboard driver to the extensible firmware interface application. The success message indicates the new hot key has been registered.

In accordance with another aspect of the invention, apparatus in a personal computing system adds new hot keys at the firmware layer in the system architecture. The apparatus includes a keyboard driver in an extensible firmware interface, a core services module in the extensible firmware interface, and an extensible firmware interface application module. The keyboard driver has a hot key protocol and a hot key lookup table. The core services module manages the keyboard driver. The extensible firmware interface application module creates and sends hot key register requests to the keyboard driver. The hot key register request has a key number, or key scan code, and a function pointer to the hot key function routine. The keyboard driver module receives the hot key register request, detects whether the key number for the hot key request is already registered and inserts a new hot key entry in the hot key table if the key number for the key number in the hot key register request is not already registered.

The invention may be implemented as a computing system, a computer process in a computing system, or as an article of manufacture such as a computer program product or computer readable media. The computer readable media may be computer storage media readable by a computer system and encoding a computer program of instructions for executing a computer process. The computer program product may also be a propagating signal on a carrier readable by a computing system and encoding a computer program of instructions for executing a computer process.

The great utility of the invention is that it provides the flexibility of adding hot key definitions in a keyboard device driver separate from the BIOS chip.

The above and various other features as well as advantages, which characterize the present invention, will be apparent from the reading of the following detailed description and a review of the associated drawings.

DETAILED DESCRIPTION

Figure 1:
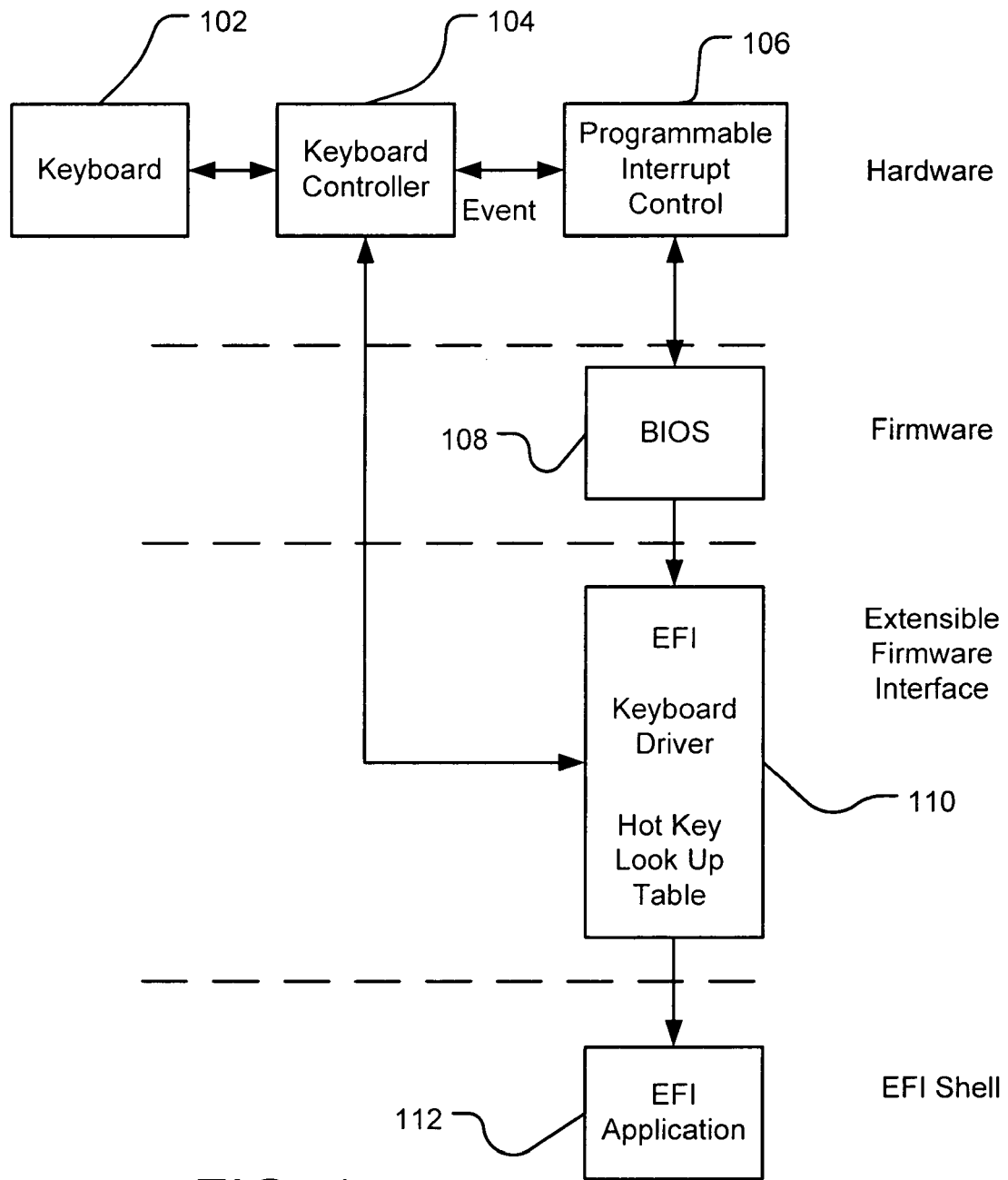
FIG. 1 illustrates the architecture of a preferred embodiment of the invention utilizing a keyboard driver in an extensible firmware interface (EFI).

As illustrated in FIG. 1, a keyboard 102 is connected to its keyboard controller 104 and causes the keyboard controller to produce a key pressed event when a key on the keyboard is pressed by the user. The key pressed event from the keyboard controller causes a programmable interrupt controller 106 to generate an interrupt request passed by the BIOS chip 108 to a keyboard driver 110 in the extensible firmware interface layer. The keyboard driver 110 reads from the keyboard controller 104 the key scan code(s) indicating what key(s) was depressed. The key scan code read from the keyboard controller 104 is used by the keyboard driver to access a hot key lookup table. The hot key lookup table will convert the key scan code(s) read from the keyboard controller to a pointer. The pointer will point to a routine to be called to execute a function defined for the hot key scan code(s) just read from the keyboard controller 104 by the keyboard driver 110.

The hot key read and function call is taking place at the firmware level, i.e. BIOS code and extensible firmware interface code. The keyboard driver has a hot key protocol to create a copy of the hot key look up table in working storage and to respond to hot key requests by an EFI application 112 to register new hot keys in the hot key lookup table created in working storage. Thus, by being able to alter the hot key lookup table controlled by the keyboard driver, new hot keys can be programmed into the computing system at the BIOS or firmware level. These hot keys would be registered and used by EFI applications during set up of the computer; thereafter, the new hot keys may be used by the operating system.

Figure 2:
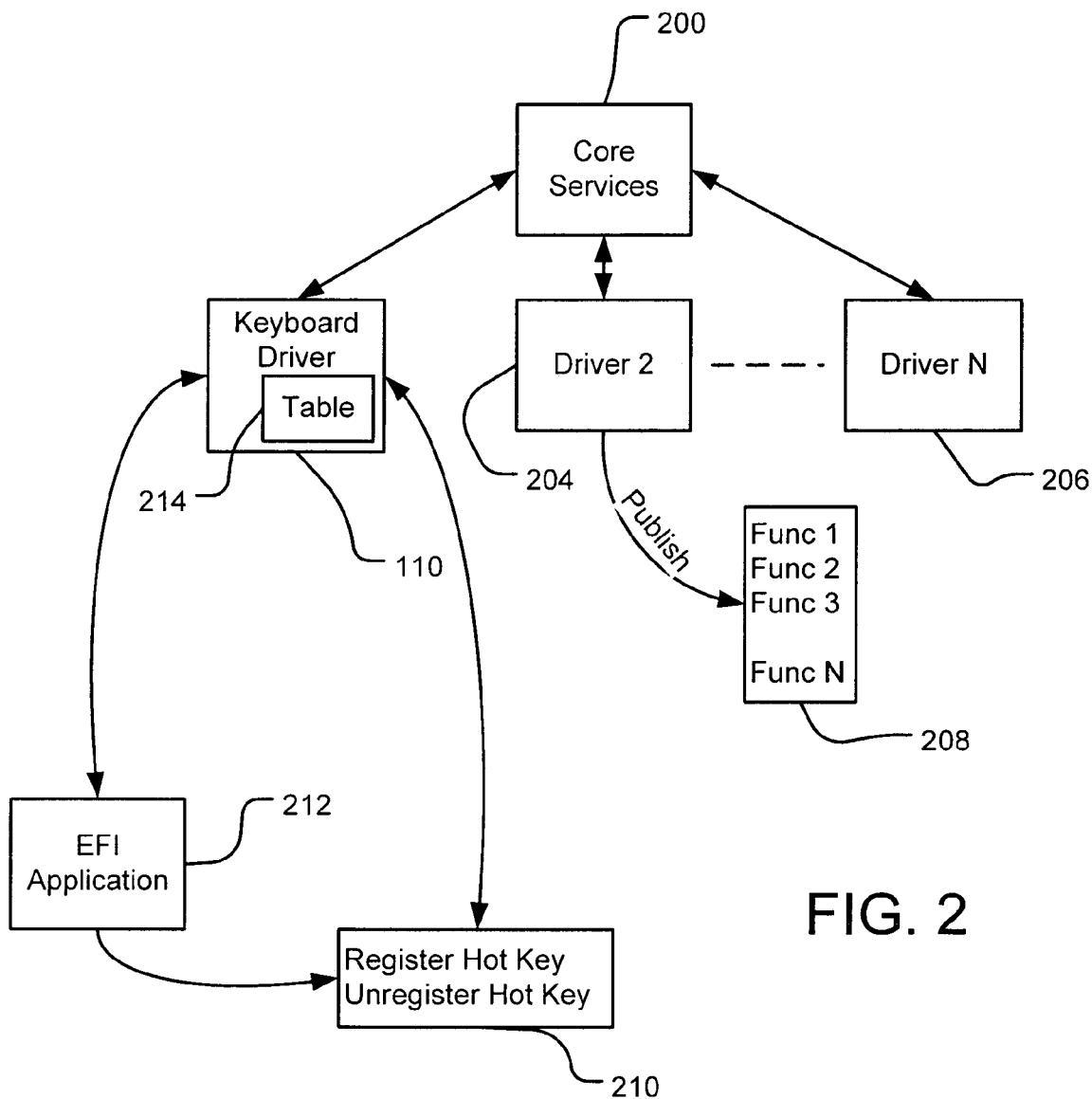
FIG. 2 shows the extensible firmware interface including the keyboard driver working with an extensible firmware interface (EFI) application to register and execute a new hot key.

FIG. 2 shows the structure of an extensible firmware interface having multiple architectural drivers 204 and 206 including the keyboard driver 110 of FIG. 1. The extensible firmware interface is made up of a core services module 200 and drivers 110, 204, and 206. Core services module 200 manages the drivers including the keyboard driver 110. The structure of drivers and the management of these drivers is described in the extensible firmware interface specification that is published by INTEL Corporation. The function of the drivers is to publish function protocols 208 that will provide functions to EFI applications working with the extensible firmware interface.

In this embodiment of the present invention, keyboard driver 110 publishes that it has a hot key protocol including a register hot key function and an unregister hot key function. The published register and unregister functions 210 may be called by the EFI application 212. An EFI application 212 knows that it wishes to register a new hot key in the hot key lookup table 214 controlled by the keyboard driver 110. It further knows from the register and unregister hot key functions 210 published by the driver 110 that it may register new hot keys in the table 214. Once a new hot key is registered in table 214 then the EFI application 212 may request that hot key from the driver 110.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 3:
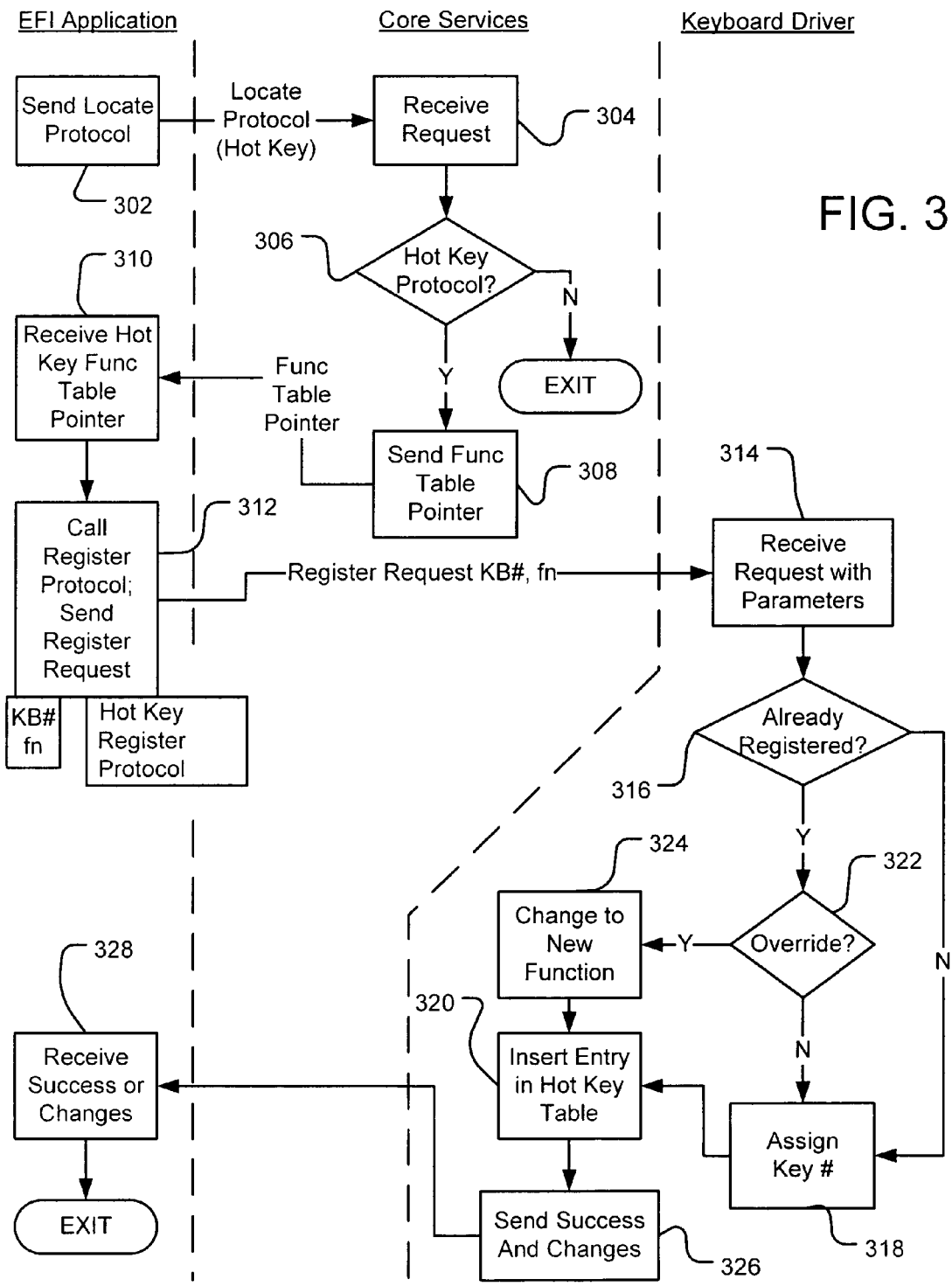
FIG. 3 shows the operational flow that occurs between the EFI application, the core services in the EFI, and the keyboard driver to register a new hot key in a preferred embodiment of the invention.

FIG. 3 shows the operational flow for registering a new hot key requested by the EFI application as shown in FIG. 2. The registration operational flow is performed by the EFI application 212, the core services module 200 in the EFI and the keyboard driver 110 in the EFI shown in FIG. 2. The operational flow begins with the EFI application at send operation 302 which is sending a locate hot key protocol message to the core services module. Receive operation 304 in the core services module receives this request to locate the hot key protocol. If there is a hot key protocol, the operational flow branches YES from the hot key protocol detect operation 306 to the send pointer operation 308. If there is no hot key protocol available from the keyboard driver managed by the core services then the operation flow branches NO from detect operation 306 and exits the hot key protocol registration flow.

When there is a hot key protocol, send pointer operation 308 sends a function table pointer back to the EFI application. Receive operation 310 at the EFI application receives this hot key function table pointer and passes the operation flow to the register request operation 312. The function table is a table of functions and associated pointers to the function that are available from the keyboard driver. The register request operation performs multiple operations—it calls up the register protocol published by the keyboard driver, it gets the function pointer for the function defined for the hot key from the function table, and it sends out the register request. The register request contains the key number, function pointer for the function defined for the hot key and registration parameters. The registration parameters include an override value and skip normal value. These parameter flags are used by the keyboard driver as discussed below. The register request is sent from the EFI application to the keyboard driver.

At the keyboard driver receive operation 314, the register request for the hot key is received along with the registration parameters for that hot key. Already registered test operation 316 then detects whether the key number for the key has already been registered. If it has not been registered, then the operation flow branches NO from test operation 316 to assign operation 318. Assign operation 318 assigns a key number to the hot key and passes the operation flow to insert entry operation 320. Insert entry operation 320 then inserts into the hot key table the assigned key number and a pointer to a code location for the code to execute its function.

If the "already registered" test operation 316 detects that the key has already been registered then the operation flow will branch YES to the override test operation 322. Override test operation 322 detects whether an override parameter value has been sent with the register request. If it has, then the operation flow will branch YES to the change operation 324. Change operation 324 will change the function of the already assigned hot key to the new function in the register request. From change operation 324 the operation flow passes to the insert entry operation 320. Insert entry operation 320 now inserts into the hot key table a new function pointer for the hot key already registered.

If the override test operation 322 detects that the prior assignment of the registered hot key is not to be overridden then the operation flow branches NO from override test operation 322 to assign operation 318. Assign operation 318 now assigns a new key number to the hot key in response to the request for a registered hot key. In other words, the register request has requested a key number and a function for a hot key which cannot be satisfied because the key number is already assigned and the function can not be overridden. In this situation, a new key is assigned for that function and the operation flow passes to the insert entry operation 320. Insert entry operation 320 then inserts into the hot key table the new assigned key number and a pointer for the function to be executed when that key is pressed. Note that in this case a hot key has been defined for the desired function, and the key number represents a different key than that which was requested.

After the insert entry operation 320, send operation 326 sends back to the EFI application a success message to indicate that the requested hot key has been registered. Further, the send operation sends back any changes to the hot key when the request resulted in changes to the key number associated with a function because the hot key was already registered for another function. The EFI application receives the success and changes messages at receive operation 328 and the operation flow exits from the registration operational flow.

Figure 4:
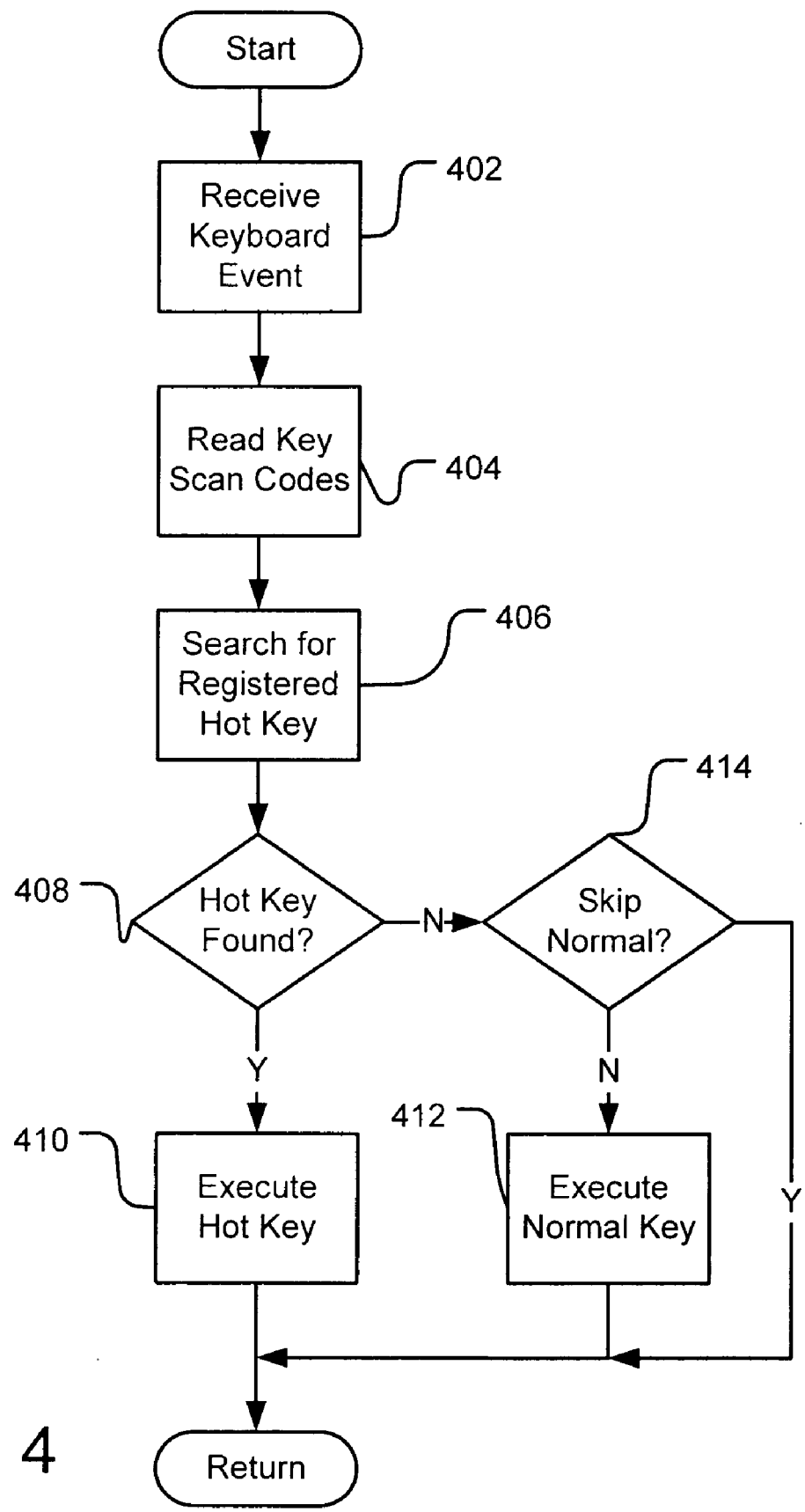
FIG. 4 shows the operational flow performed by the keyboard driver in using a registered hot key.

FIG. 4 illustrates the operation flow for utilizing a registered hot key. When a key press event occurs, the keyboard driver receives the keyboard event at receive operation 402. The read operation 404 then reads the key scan codes from the keyboard controller to detect which key was pressed. The key number can also have a skip normal processing parameter value stored with it in the hot key lookup table which is used in search operation 406. This parameter value will cause the normal processing of the key to be inhibited if a registered hot key for the key number is not found. Following this read operation 404, search operation 406 searches the hot key table to detect whether the pressed key(s) is a registered hot key. Hot key found test operation 408 detects when a registered hot key is found.

If a registered hot key is found then the operation flow branches YES to the execute hot key function operation 410. The execute hot key function operation makes use of the pointer to the function that is provided in the hot key table. It uses the pointer to call up the routine implementing the hot key function. If the hot key is not found in the hot key table the operational flow would branch NO to the skip normal test operation 414. Test operation 414 usually passes the flow to the execute normal key operation 412. In other words, if there is no hot key associated with the key press then the normal key function for the key is executed. However if there is no registered hot key, and if a skip normal processing parameter value is present, test operation 414 will branch the flow YES to exit the hot key use operational flow in FIG. 4.

While the invention has been particularly shown and described with reference to preferred embodiments thereof, it will be understood by those skilled in the art that various other changes in the form and details may be made therein without departing from the spirit and scope of the invention.

What is claimed is:

1. In a personal computing system that includes a BIOS chip, a method comprising:
    publishing a hot key protocol that provides a first function for registering at least one hot key sequence at a firmware level within the personal computing system, and that provides at least a second function for unregistering the at least one hot key sequence at the firmware level, wherein the first and second functions are callable by an extensible firmware interface (EFI) application to register or unregister the hot key sequences in a hot key lookup table located in a keyboard driver, wherein the keyboard driver is separate from the BIOS chip;
    receiving from the EFI application at least one request to register a hot key sequence, the request to register a hot key sequence having a key number and a function pointer to a hot key function associated with the hot key sequence within hot key lookup table;
    sending the request to register the hot key sequence to the keyboard driver;
    creating a further hot key lookup table in working storage, based upon the hot key lookup table in the keyboard driver;
    inserting an entry into the further hot key table in working storage, the entry including the key number and function pointer from the request to register the hot key sequence, to add the hot key sequence as a registered hot key sequence; and
    responding to activation of the hot key sequence during boot-up of the computing system by performing the function associated with the hot key sequence.

2. The method of claim 1 further comprising:
    sending a success message from the keyboard driver to the EFI application, the success message indicating the new hot key sequence has been registered.

3. The method of claim 2 further comprising:
    detecting whether the key number in the request to register is already a registered hot key sequence;
    assigning the key number to the entry for the new hot key sequence if the key number in the request to register is not already a registered hot key sequence.

4. The method of claim 3 further comprising:
    testing whether the request to register includes an override parameter value if the key number in the request to register is already registered;
    changing the function pointer for an already registered hot key sequence to the function pointer in the request to register if there is an override parameter value in the request to register.

5. The method of claim 4 further wherein the success message indicates the new hot key sequence has been registered and any changes to key numbers or function pointers of the registered hot key sequences.

6. The method of claim 1 further comprising:
    detecting whether a hot key protocol exists at the keyboard driver in the EFI;
    sending a function table pointer to the EFI application creating the request to register.

7. The method of claim 1 further comprising:
    receiving a keyboard event when at least one key is pressed;
    searching to determine if the at least one key pressed represents a registered hot key sequence; and
    executing the hot key sequence's function if the key pressed is a registered hot key sequence.

8. The method of claim 7 further comprising:
    executing a normal key function if the at least one key pressed is not a registered hot key sequence.

9. The method of claim 7 further comprising:
    testing whether a skip normal processing parameter value is included with the key number read for the keyboard event if the at least one key pressed is not a registered hot key sequence;
    skipping normal key processing if the skip normal processing parameter value is included.

10. In a personal computing system that includes a BIOS chip and that has a system architecture that includes at least a hardware layer, a firmware layer, and an extensible firmware interface (EFI) layer, apparatus for registering new hot keys at the firmware layer, the apparatus comprising:
    a keyboard driver provided in the EFI layer and separate from the BIOS chip, the keyboard driver defining a protocol for requesting registration of the new hot keys, and for maintaining a hot key lookup table that maps hot key sequences to be associated with functions accessible using the hot keys;
    a core services module in the EFI layer for managing the keyboard driver;
    an EFI application module in the EFI layer for creating and sending at least one request to the keyboard driver to register at least one new hot key sequence, the request to register the new hot key sequence comprising a key number identifying the new hot key, and comprising a function pointer to a function to be associated with the new hot key; and
    the keyboard driver module for receiving the request to register the new hot key sequence, for detecting whether the key number is already registered, and for inserting a new entry in the hot key table for the new hot key sequence, if the key number for the request is not already registered, wherein the keyboard driver is responsive to activation of the hot key sequence during boot-up of the computing system to perform the function associated with the hot key sequence.

11. The apparatus of claim 10, wherein the keyboard driver is for creating a copy of the hot key table in working storage before inserting the new entry in the copy of the hot key table in working storage.

12. The apparatus of claim 11, wherein the keyboard driver is for detecting whether the request to register the hot key includes an override parameter, if the key number in the hot key requested is already registered in the hot key table, and wherein the keyboard driver is for changing the function pointer for the key number in the hot key table to the pointer in the request to register, if the override parameter is present in the request to register.

13. The apparatus of claim 12, wherein the keyboard driver is for sending a success message to the EFI application module if the new hot key sequence is successfully registered in the hot key table, wherein the success message includes change information indicating whether the key number or the function associated with the new hot key sequence has been changed during registration in the hot key table.

14. The apparatus of claim 10, wherein:
the application module is for sending to the core services module a message for locating the protocol for requesting registration of the new hot key sequences;
the core services module is for detecting whether the keyboard driver defines the protocol, and is for sending a function pointer to the application module if the keyboard driver defines the protocol, the function pointer pointing to the hot key functions available from the keyboard driver.

15. The apparatus of claim 10, further comprising a keyboard controller for connecting to a keyboard having a plurality of keys, for receiving notifications of at least one of the keys being pressed, for generating keyboard events in response to the notifications, and for maintaining key scan codes that indicate which keys are pressed, and wherein:
the keyboard driver is for receiving the keyboard event and for reading from the keyboard controller the key scan code for the key pressed; and
the keyboard driver is for searching the hot key lookup table to detect whether the key pressed is a hot key sequence, and for executing the function associated with the hot key sequence, if the key pressed is a registered hot key sequence.

16. The apparatus of claim 15, wherein the keyboard driver executes a normal key function for the key pressed, if the key pressed is not a registered hot key sequence.

17. The apparatus of claim 15, wherein the keyboard driver module skips a normal key function for the key pressed, if the key pressed is not a registered hot key sequence, in response to a parameter specifying that the normal key function is to be skipped.

* * * * *